(12) United States Patent
Kuledge et al.

(10) Patent No.: US 11,762,819 B2
(45) Date of Patent: Sep. 19, 2023

(54) CLUSTERING MODEL ANALYSIS FOR BIG DATA ENVIRONMENTS

(71) Applicant: Target Brands, Inc., Minneapolis, MN (US)

(72) Inventors: Andrew Kuledge, Saint Paul, MN (US); Reed Thunstrom, Minneapolis, MN (US); Jennifer Reiter, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 765 days.

(21) Appl. No.: 16/653,697

(22) Filed: Oct. 15, 2019

(65) Prior Publication Data

US 2021/0109906 A1 Apr. 15, 2021

(51) Int. Cl.
| | |
|---|---|
| *G06F 11/00* | (2006.01) |
| *G06F 16/21* | (2019.01) |
| *G06F 16/10* | (2019.01) |
| *G06F 16/22* | (2019.01) |
| *G06F 16/28* | (2019.01) |

(52) U.S. Cl.
CPC ............ *G06F 16/212* (2019.01); *G06F 16/10* (2019.01); *G06F 16/2282* (2019.01); *G06F 16/285* (2019.01)

(58) Field of Classification Search
USPC .......................................... 707/737
See application file for complete search history.

(56) References Cited

U.S. PATENT DOCUMENTS

| | | | |
|---|---|---|---|
| 10,824,956 B1* | 11/2020 | Natanzon | ................ H04L 43/06 |
| 11,016,824 B1* | 5/2021 | Wells | .................. G06F 11/3075 |
| 2003/0212693 A1* | 11/2003 | Campos | ................ G06F 16/287 |
| 2005/0071140 A1 | 3/2005 | Ben-Hur et al. | |
| 2007/0022065 A1 | 1/2007 | Hatano et al. | |
| 2015/0228015 A1 | 8/2015 | Bhattacharya et al. | |
| 2016/0034558 A1 | 2/2016 | Duan et al. | |
| 2017/0154280 A1 | 6/2017 | Adir et al. | |
| 2018/0173372 A1* | 6/2018 | Greenspan | .......... G06F 16/2465 |

(Continued)

OTHER PUBLICATIONS

US 8,712,906 B1, 04/2014, Sprague et al. (withdrawn)

*Primary Examiner* — Tuankhanh D Phan
(74) *Attorney, Agent, or Firm* — Merchant & Gould P.C.

(57) ABSTRACT

A method of persisting and performing a clustering analysis through use of a large data electronic file system includes generating a job identifier and linking the job identifier with a configuration identifier, a plurality of model identifiers and a plurality of data regularization identifiers. Each of the configuration identifier, model identifiers and data regularization identifiers are stored in respective management tables of the file system along with meta-data indicating a physical location of an analysis configuration, a physical location of a data regularizer and a physical location of a clustering model, respectively. The method further includes specifying the job identifier to a clustering analysis application causing the analysis configuration, the clustering models and the data regularizers to load into the clustering analysis application and receiving a plurality of scores resulting from a cluster analysis performed by the clustering analysis application based on the job identifier.

20 Claims, 6 Drawing Sheets

(56) References Cited

U.S. PATENT DOCUMENTS

| | | | |
|---|---|---|---|
| 2018/0307943 A1 | 10/2018 | Savkli et al. | |
| 2019/0209022 A1* | 7/2019 | Sobol | H04W 4/025 |
| 2019/0286739 A1* | 9/2019 | Modarresi | G06F 16/2465 |
| 2020/0067789 A1* | 2/2020 | Khuti | H04L 41/5009 |
| 2020/0387818 A1* | 12/2020 | Chan | G06N 20/00 |
| 2022/0058528 A1* | 2/2022 | Murakonda | G06F 40/30 |

* cited by examiner

| Metrics |
|---|
| 1. Percent of guests with Retail Card spend |
| 2. Percent of guests who only spend during Holiday season |
| 3. Avg number of trips in last 365 days |
| 4. Avg number of trips in last 84 days |
| 5. Avg ratio of Retail Card spend to Total spend in last 365 days |
| 6. Avg total sales in last 365 days |
| 7. Avg sales for Store Grocery in last 365 days |
| 8. Avg sales for Store Ess Beauty in last 365 days |
| 9. Avg sales for Store Apparel/Accessories in last 365 days |
| 10. Avg sales for Store Hardlines in last 365 days |
| 11. Avg sales for Store Home in last 365 days |
| 12. Avg sales for Online Grocery in last 365 days |
| 13. Avg sales for Online Ess Beauty in last 365 days |
| 14. Avg sales for Online Apparel/Accessories in last 365 days |
| 15. Avg sales for Online Hardlines in last 365 days |
| 16. Avg sales for Online Home in last 365 days |
| 17. Avg trips for Store Grocery in last 365 days |
| 18. Avg trips for Store Ess Beauty in last 365 days |
| 19. Avg trips for Store Apparel/Accessories in last 365 days |
| 20. Avg trips for Store Hardlines in last 365 days |
| 21. Avg trips for Store Home in last 365 days |
| 22. Avg trips for Online Grocery in last 365 days |
| 23. Avg trips for Online Ess Beauty in last 365 days |
| 24. Avg trips for Online Apparel/Accessories in last 365 days |
| 25. Avg trips for Online Hardlines in last 365 days |
| 26. Avg trips for Online Home in last 365 days |

CLUSTERING MODEL ANALYSIS FOR BIG DATA ENVIRONMENTS

TECHNICAL FIELD

The present disclosure is directed to clustering model analysis and, more particularly, to assessing clustering models in a big data environment.

BACKGROUND

Big data, e.g. data sets that are too large or too complex to be dealt with by traditional data processing techniques, can now be analyzed using clusters to identify patterns, trends and associations within the data. Clustering is a type of data mining that is used to identify groups, or clusters, of similar objects. As businesses gather huge amounts of data in relation to their products, services, marketing, sales, etc., clustering can be particularly useful to help businesses manage that data. For example, in retail and e-retail businesses, clustering can be used to identify trends in customer shopping behavior, sales campaigns, and customer retention. In the insurance industry, clustering can be used to identify trends related to fraud detection or risk factor identification. In the banking industry, clustering can be used to identify trends related to customer segmentation, credit scoring and customer profitability. Numerous other application for clustering are also possible. Clustering analysis is performed with an eye toward being able to predict future trends, patterns or associations based on what has happened in the past.

However, inherent in data clustering, is the problem of obtaining an optimal clustering model for a set of data features. In an attempt to obtain an optimal clustering model, hundreds or even thousands of clustering models are generated. Reducing the hundreds or thousands of clustering models to an optimal clustering model and tracking the models for reference or reuse is a problem faced by data engineers.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An aspect of the present disclosure is directed to a method of persisting and performing a clustering analysis through use of a large data electronic file system (e.g., Hadoop or other electronic file system capable of storing and processing large amounts of data). The method includes, within the large data electronic file system, generating a job identifier and linking the job identifier with a configuration identifier, a plurality of model identifiers and a plurality of data regularization identifiers. Each of the configuration identifier, model identifiers and data regularization identifiers are stored in respective management tables of the file system along with meta-data indicating a physical location of an analysis configuration, a physical location of a data regularizer and a physical location of a clustering model, respectively. The method further includes specifying the job identifier to a clustering analysis application causing the analysis configuration, the clustering models and the data regularizers to load into the clustering analysis application and receiving a plurality of scores resulting from a cluster analysis performed by the clustering analysis application based on the job identifier.

Another aspect of the present disclosure is directed to a method of utilizing a large data electronic file system. The method includes defining a cluster analysis configuration that includes meta-data identifying: a selected data set and a location of the selected data set, a plurality of clustering models and a location of the plurality of clustering algorithms, and a plurality of data regularizers and a location of the plurality of data regularizer. The method further includes generating a unique configuration identifier, associating the unique configuration identifier with the cluster analysis configuration, and storing the unique configuration identifier in a configuration management table along with the meta-data of the cluster analysis configuration. The method further includes generating and storing a job identifier that identifies a clustering analysis to be performed, wherein the job identifier is linked to the unique configuration identifier. The method further includes generating a unique data regularizer identifier for each of the plurality of data regularizers of the cluster analysis configuration and storing each unique data regularizer identifier in a data regularizer management table along with meta-data for each of the data regularizer identifiers, wherein each of the unique data regularizer identifiers is linked to the job identifier. The method further includes generating a unique model identifier for each of the plurality of clustering models of the cluster analysis configuration and storing each unique model identifier in a model management table along with meta-data for each of the model identifiers, wherein each of the unique model identifiers is linked to the job identifier.

BRIEF DESCRIPTION OF THE DRAWINGS

Non-limiting and non-exhaustive examples are described with reference to the following Figures.

DETAILED DESCRIPTION

Various embodiments will be described in detail with reference to the drawings that form a part hereof and, in which are shown by way of illustrations, specific embodiments or examples. Embodiments can be practiced as methods, systems or devices. Accordingly, embodiments may take the form of a hardware implementation, a software implementation, or an implementation combining both hardware and software. The following detailed description is therefore not to be taken in a limiting sense, and the scope of the present disclosure is defined by the appended claims and their equivalents.

The present disclosure is directed to clustering model assessment in a big data environment wherein different methods of clustering, and the models generated by the different methods, are assessed against one another to determine a single method and model that is optimal for the data features under consideration. The assessment is achieved through a platform that provides: selection of data features, such as data attributes and key data metrics of an available data store; cluster model generation based on the selected data features utilizing at least two different clustering algorithms; cluster analysis of cluster models generated by the different clustering algorithms to determine an optimal number of clusters for the selected data features; and recommendation analysis of the cluster models generated by the different clustering algorithms, which have used the optimal number of clusters, to recommend a single final clustering model for actual use.

The clustering model analysis for big data environments, as described herein, is persisted within a big data electronic file system through a unique process enabling tracking and reuse of one or more elements of the clustering model analysis. Each element, or combination of elements, associated with the clustering model analysis is provided with its own unique identifier. The unique identifier is associated with meta-data that describes the contents of the element as well as where the element is physically persisted within the file system, such as an Apache Hadoop file system (HDFS) or other file system suited to storing and processing large amounts of data. The unique identifiers and associated meta-data, as well as scoring and analysis results are stored in various management tables of the HDFS and are linked through a common job identifier.

The description provided herein is done so in reference to a particular application of clustering model analysis, i.e., clustering model analysis for behavioral guest segmentation. It should be understood that, while a specific example and application are used, the systems and methods for clustering model analysis are equally applicable to any big data environment for which there is a desire to identify trends, patterns or associations.

Behavioral segmentation enables a retailer to segment their guests based on patterns of behavior displayed by their guests as they interact with the retailer, interact with the retailer's brands, or make a purchasing decision. Behavioral segmentation enables a retailer to divide their guests into groups based on a guest's knowledge of a product or brand, a guests' attitude towards a product or brand, a guest's user of a product or brand, and/or a guest's response to a product or brand. The ability to group guests based on one or more shared characteristics enables a retailer to more accurately personalize their marketing communications with the guest. Marketing communications personalized to a specific segment of guests can include, for example, product promotion communications to generate demand for a product, brand awareness communications to build brand reputation, advertising communications to generate demand and build brand awareness, and guest service communications to handle guest inquiries. There are numerous methods and models for performing behavioral segmentation, however, determining which of those methods and models to use is often unclear.

Figure 1:
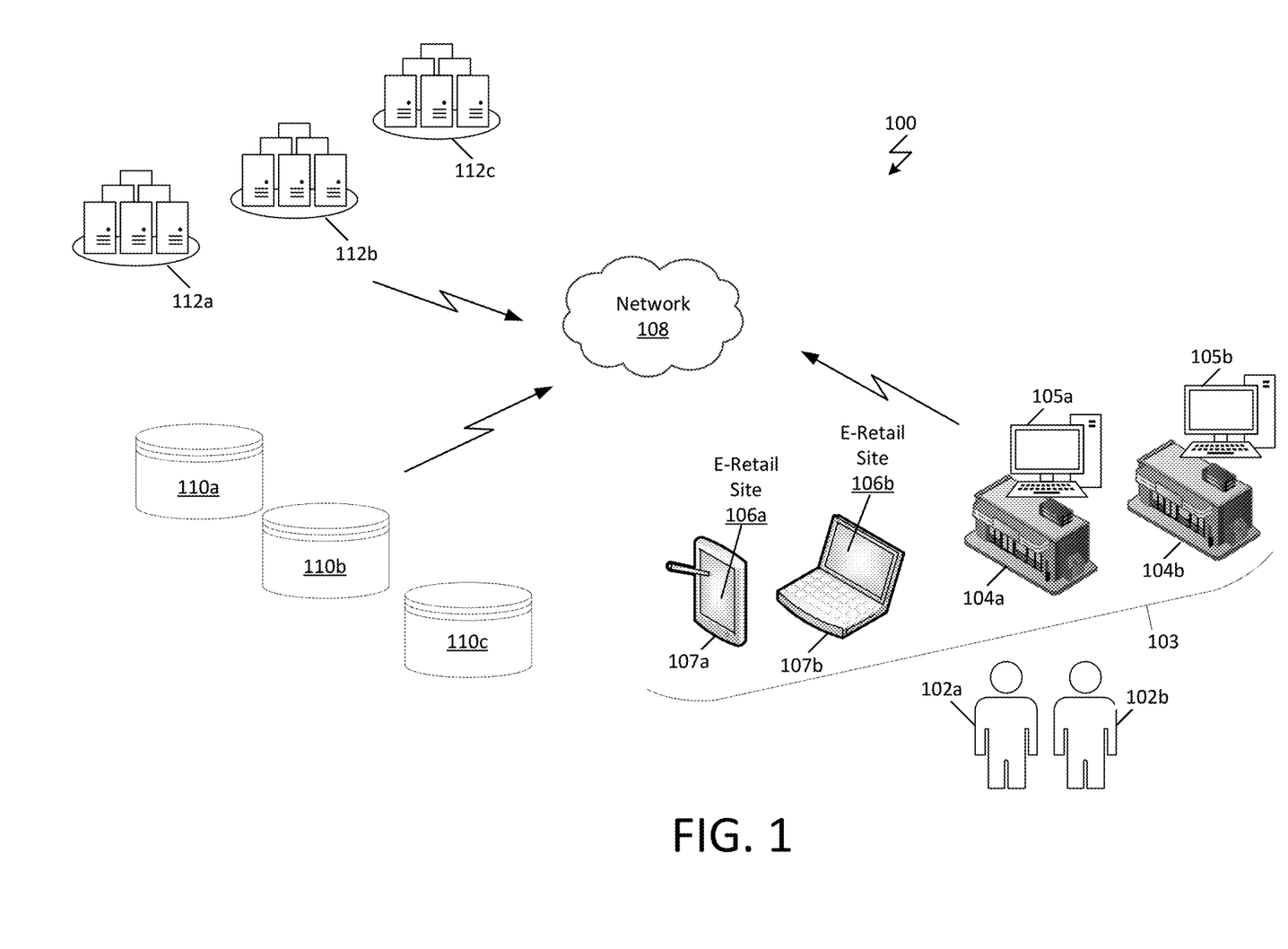
FIG. 1 is an example configuration of an environment that is used for gathering guest characteristic data and executing behavioral segmentation clustering model assessment.

Referring to FIG. 1, an example configuration of an environment 100 that generates guest characteristic data and performs behavioral guest segmentation clustering model analysis based on the guest characteristic data is illustrated. Data generators of the environment 100 comprise a plurality of retail guests 102, represented by guests 102a and 102b, and one or more retailers, represented by retailer 103, with the generated guest characteristic data being representative of the spending transactions between the retail guests 102 and the retailer 103. In the example of FIG. 1, the retailer 103 is represented by both physical retail sites 104 and e-retail websites 106. Each physical retail site 104, e.g., physical retail site 104a and 104b, utilizes one or more retail computing devices 105, e.g., retail computing device 105a, 105b, for generating, tracking, transmitting and/or receiving data related to guest/retailer spending transactions. Each e-retail website 106, e.g. e-retail website 106a and 106b, is accessed via one or more e-retail computing devices 107, e.g. e-retail computing device 107a and 107b, which can be used for generating, transmitting and/or receiving data related to guest/retailer spending transactions.

The guest characteristic data generated from the spending transactions between guests 102 and the retailer 103 are transmitted through a network 108 and stored in one or more databases of one or more memory devices 110 (e.g., memory device 110a, memory device 110b, memory device 110c). The data stored by the one or more memory devices 110 is accessible via network 108 (or direct access) by one or more server computing devices 112 (e.g., server computing devices 112a, server computing devices 112b, server computing devices 112c). The one or more server computing devices 112 execute instructions to assess behavioral segmentation clustering models as further detailed herein. Note the environment 100 is but one possible configuration of an environment for generating guest characteristic data and performing behavioral segmentation clustering model assessment and, as known by those skilled in the art, can be condensed or expanded to include a fewer or greater number of elements than that depicted.

In a basic configuration, the one or more e-retail computing devices 107 are personal or handheld computers having both input elements and output elements operated by the one or more guests 102. For example, the one or more e-retail computing devices 107 may include one or more of: a mobile telephone; a smart phone; a tablet; a phablet; a smart watch; a wearable computer; a personal computer; a desktop computer; a laptop computer; a gaming device/computer (e.g., Xbox); a television; and the like. This list is only and should not be considered as limiting. Any suitable e-retail computing device 107 for generating and/or tracking spending transactions between guests 102 and the retailer 103 can be used. Similarly the one or more retail computing devices 105 are computing devices having both input and output elements operated by one or more retail employees that are capable of generating and/or tracking transactional spending data relating to in-store retail spending transactions occurring at the physical retail site 104.

The transactional spending data between guests 102 and the retailer 103 generally includes how much is spent by a guest 102 at the one or more physical retail sites or on the one or more e-retail websites 106 as well as how many trips the guest 102 has made to the physical retail site 104 or the e-retail website 106. More specific examples of transactional spending data are detailed herein.

In certain embodiments, the network 108 is a computer network such as an enterprise intranet and/or the Internet. In this regard, the network 108 may include a Local Area Network (LAN), a Wide Area Network (WAN), the Internet, wireless and wired transmission mediums. In certain embodiments, server computing devices 112 may communicate with some components of the environment via a local network (e.g., an enterprise intranet), whereas another server computing device 112 may communicate with other components of the environment via a wide area network (e.g., the Internet). In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet.

In a basic configuration, server computing devices 112 may include at least a processing unit and a system memory for executing computer-readable instructions. In some aspects, server computing devices 112 may comprise one or more server computing devices 112 in a distributed environment (e.g., cloud-based computing environment).

Figure 2:
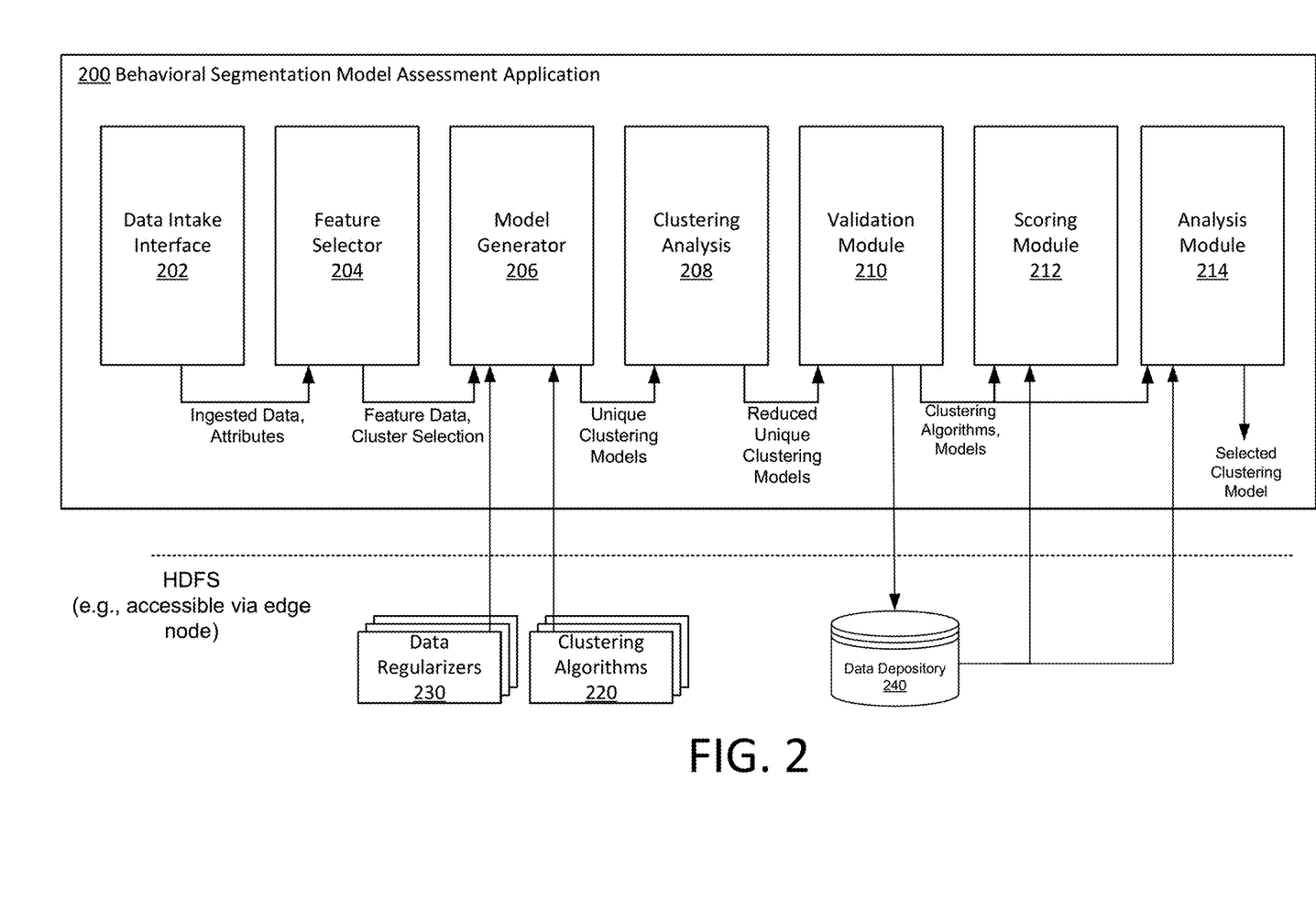
FIG. 2 is an example configuration of a behavioral segmentation clustering model assessment application.

In certain embodiments, the server computing devices 112 execute instructions of a behavioral segmentation model assessment application. Referring to FIG. 2, an example configuration of a behavioral segmentation model assessment application 200 is illustrated. As shown the behavioral segmentation model assessment application 200 includes a data intake interface 202, a feature selector 204, a model generator 206, a clustering analysis module 208, a validation module 210, a scoring module 212, and an analysis module 214.

The data intake interface 202 receives guest characteristic data (e.g., the guest characteristic data stored on memory devices 110) for guests 102 that have purchased items from one or more physical retail sites 104 and/or from one or more e-retail websites 106 of the retailer 103. By way of example, a physical retail site of the retailer TARGET® may comprise a TARGET® store while an e-retail website of the retailer TARGET® may comprise TARGET.com. In certain example embodiments, the guest characteristic data can be associated with one or more specific physical retail sites 104 and/or one or more specific e-retail websites 106 of the retailer 103 according to retailer definition. For example, a retailer definition may include only physical retail sites 104 (worldwide, national, by state, by city, etc.) or may include only e-retail websites (worldwide, by country, etc.) or a combination of specific physical retail sites 104 and specific e-retail websites 106.

The guest characteristic data supplied to the data intake interface 202 comprises data that is associated with a predefined data attribute. Data attributes, e.g., definitions of data, can vary according to user-interest. Examples of possible data attributes include: guest zip code, guest area code, guest spend at a specific retail site, a guest use of a retail card, guest spend during the holiday season, guest trips in the last year, guest purchase total in dollars, guest purchase total in items, guest purchase total of a specific item in dollars or quantity of the specific item, guest purchase total of a category of items in dollars or quantity of the items in the category, or any other common characteristic that can be identified within the data. These data attributes can be further narrowed by including in the definition of the data attribute a specific time period or length of time, a specific retailer, a specific population segment, a specific type of purchases, or other desired narrowing definition. Of course, other data attributes alone or in combination, as appropriate to the data under consideration, may be used.

The guest characteristic data received by the data intake interface 202 is provided to a feature selector 204. The feature selector 204 enables a user to define data features and/or select from pre-defined data features that can be used to group the guest characteristic data as well as select clustering model algorithms, data regularizers and initial cluster ranges.

In certain embodiments, with regard to selecting data features, one or more decision trees are used to reduce the number of selectable features; a decision tree in this context includes every possible selectable data feature and the result, as indicated by a risk/reward value, of selecting each of possible selectable data feature. The data features selected can include data attributes of interest and key data metrics of interest. In certain embodiments the underlying guest characteristic data associated with the selected data features comprise numeric data only while in other embodiments the underlying guest characteristic data comprises both numeric and non-numeric data, or only non-numeric data. In certain embodiments, the data metrics of interest are numerical calculations of quantifiable measures, for example, a percentage or an average.

Figure 3:
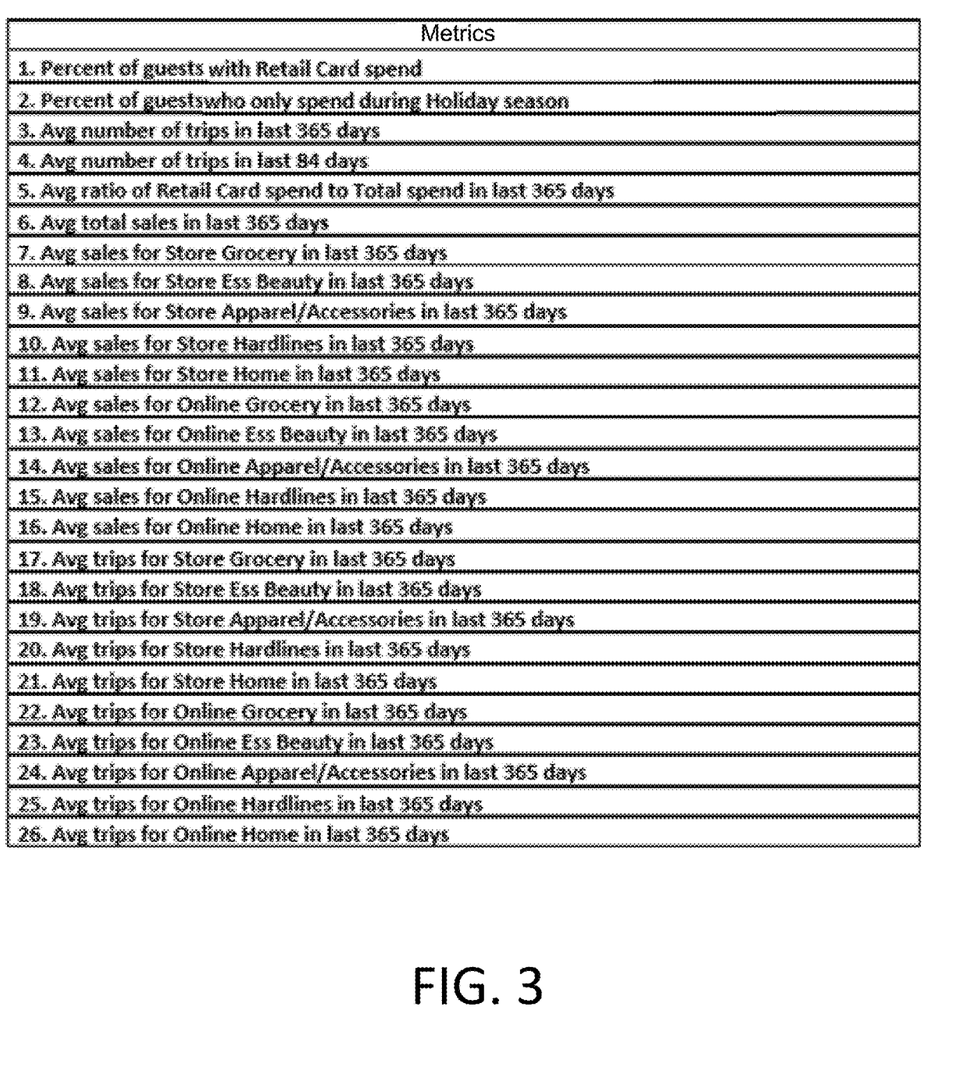
FIG. 3 is an example listing of data metrics that can be calculated based on guest characteristic data.

Some examples of possible data metrics are listed in FIG. 3 with a detailed description of the data metric provided below. Of course, other data metrics, as appropriate to the data under consideration, may be used.

Examples of Data Metrics

1. A determination of a percentage of guests with retail card spending (e.g. a retail credit or debit card associated with a retailer and/or e-retailer) at a specific one or more physical retail sites and/or one or more associated e-retail websites.

2. A determination of a percentage of guests with spending only during a pre-defined holiday season (e.g. from Thanksgiving in November to the New Year) at the specific one or more physical retail sites and/or one or more associated e-retail websites.

3. A determination of the average number of trips by spending guests to the specific one or more physical retail sites and/or one or more associated e-retail websites in the last year.

4. A determination of the average number of trips by spending guests to the specific one or more physical retail sites and/or one or more associated e-retail websites in a last predefined number of days (e.g. the last 84 days).

5. A determination of the average ratio of retail card spending to total spending for the guests at the specific one or more physical retail sites and/or one or more associated e-retail websites in the last year.

6. A determination of the average total sales in the last year by the guests at the specific one or more physical retail sites and/or one or more associated e-retail websites.

7. A determination of the average sales of grocery products at the specific one or more physical retail sites by guests in the last year.

8. A determination of the average sales of essential beauty products at the specific one or more physical retail sites by guests in the last year.

9. A determination of the average sales of apparel/accessory products at the specific one or more physical retail sites by guests in the last year.

10. A determination of the average sales of hardline products at the specific one or more physical retail sites by guests in the last year.

11. A determination of the average sales of home products at the specific one or more physical retail sites by guests in the last year.

12. A determination of the average sales of grocery products via the e-retailer website by guests in the last year.

13. A determination of the average sales of essential beauty products via the e-retailer website by guests in the last year.

14. A determination of the average sales of apparel/accessory products via the e-retailer website by guests in the last year.

15. A determination of the average sales of hardline products via the e-retailer website by guests in the last year.

16. A determination of the average sales of home products via the e-retailer website by guests in the last year.

17. A determination of the average number of trips by the spending guests to the specific one or more physical retail sites for the purchase of grocery products in the last year.

18. A determination of the average number of trips by the spending guests to the specific one or more physical retail sites for the purchase of essential beauty products in the last year.

19. A determination of the average number of trips by the spending guests to the specific one or more physical retail sites for the purchase of apparel/accessory products in the last year.

20. A determination of the average number of trips by the spending guests to the specific one or more physical retail sites for the purchase of hardline products in the last year.

21. A determination of the average number of trips by the spending guests to the specific one or more physical retail sites for the purchase of home products in the last year.

22. A determination of the average number of trips by the spending guests via the e-retailer website for the purchase of grocery products in the last year.

23. A determination of the average number of trips by the spending guests via the e-retailer website for the purchase of essential beauty products in the last year.

24. A determination of the average number of trips by the spending guests via the e-retailer website for the purchase of apparel/accessory products in the last year.

25. A determination of the average number of trips by the spending guests via the e-retailer website for the purchase of hardline products in the last year.

26. A determination of the average number of trips by the spending guests via the e-retailer website for the purchase of home products in the last year.

In certain embodiments, a user is able select, via the feature selector 204, at least two (or more) clustering algorithms 220 from among a plurality of clustering algorithms to be used in the behavioral segmentation clustering model assessment while in other embodiments that clustering algorithms to be used in the assessment are predetermined. The clustering algorithms can include, for example, a K-means clustering algorithm, a bisecting K-means algorithm or any other suitable clustering algorithm. A K-means clustering algorithm partitions n number of the data features into k number of clusters in which each data feature belongs to the cluster with the nearest mean. A bisecting K-means clustering algorithm is similar to the K-means clustering algorithm with the number of clusters for each clustering iteration set to 2. Clusters are a collection of data points aggregated together because of one or more certain similarities. A good clustering is one where the cluster are densely packed, separated from other clusters and well-balanced in terms of size.

In certain embodiments, one or more data regularization schemes 230 are selected, via the feature selector 204, to be performed on the guest characteristic data associated with the selected data features and/or are performed on the resulting calculations of the selected data metrics. The data regularization schemes help to prevent overfitting, wherein the production of an analysis corresponds too closely or exactly to a particular set of data and may therefore fail to fit additional data or predict future observations reliably. Examples of data regularization schemes that can be used include, for example, standardization, which transforms data such that the resulting distribution has a mean of 0 and a standard deviation of 1, and/or min-max scaling, in which data is scaled to a fixed range such as 0 to 1. Other data regularization schemes can also be used appropriate to the data under consideration.

In certain embodiments, the feature selector 204 additionally enables a user to select an initial range of clusters to be used by the selected clustering algorithms to generate the various clustering models. An example range of clusters might include 7 to 12 clusters, 4 to 16 clusters, or any other range of clusters suitable to the data under consideration.

The underlying guest characteristic data and calculated data metrics associated with the selected data features, the selected clustering model algorithms 220, the selected data regularizers 230 and the initial cluster range are then provided from the feature selector 204 to the model generator 206. The model generator 206 utilizes the at least two different clustering algorithms 230 with the selected data features to generate all possible combination of data features with each possible combination representing a unique clustering model containing the number of clusters for each number of clusters in the selected range. Based on the number of data features and the number of clusters used by the clustering algorithms, it is possible for each of the different clustering algorithms to produce hundreds or even thousands of unique clustering models.

All of the unique clustering models for each of the clustering algorithms are then analyzed in the clustering analysis module 208 to determine an optimal k number of clusters. The optimal k number of clusters can be determined through various analysis methods that can include, for example, an elbow method, a convergence method or other suitable k-optimization method. With the optimal k number of clusters selected, the clustering analysis module 208 utilizes the at least two different clustering algorithms with the selected data features to generate all possible combination of data features with each possible combination representing a unique clustering model. Each of the unique clustering models now contains only the optimal k number of clusters reducing the overall number of unique clustering models from each clustering algorithm, e.g. the number of unique clustering models is reduced from hundreds or thousands, to tens or hundreds. In one example, there is a 85% or greater reduction in the number of unique clustering models. In another example, there is a 75% or greater reduction in the number of unique clustering models. In another example, there is a 65% or greater reduction in the number of unique clustering models. In another example, there is a 50% or greater reduction in the number of unique clustering models.

The unique clustering models generated by the first clustering algorithm using the optimal k number of clusters are then assessed against the unique clustering models generated by the second different clustering algorithm using the optimal k number of clusters in the validation module 210. In the instance that more than two clustering algorithms are used, the reduced number of unique clustering models generated from each of the clustering algorithms are assessed against the unique clustering models generated by each of the other clustering algorithms.

The validation module 210 performs one or more of a silhouette coefficient analysis, cluster size distribution analysis, mutual information analysis, or other appropriate analysis on the unique clustering models with the optimal k number of clusters generated by each of the clustering algorithms to further reduce the number of unique clustering models generated by each of the clustering algorithms. In certain embodiments, a transition analysis that tracks degradation of a clustering model over time can additionally be used to further reduce the number clusters used in a clustering model.

For example, a silhouette coefficient analysis can be used at each of a global level, a cluster level, and a fine-grained observation level within the clusters. At each of the levels the silhouette coefficient analysis is used to identify and remove clustering models that present an undesirable variance or are outliers. In one example embodiment, the silhouette coefficient analysis is used to study the separation distance between clusters and determine how close each data point in one cluster is to points in the neighboring clusters. The separation distance is represented by a silhouette coefficient, typically in the range of −1 to 1, with coefficients close to zero indicating a close boundary decision between neighboring clusters, coefficients close to 1 indicating a cluster is far away from neighboring clusters and a negative value indicating data points may have been assigned to a wrong cluster. The silhouette coefficient analysis for is performed for multiple cluster scenarios, e.g. 2 cluster scenario, 3 cluster scenario, 4 cluster scenario, etc., to determine which cluster scenario produces an optimal k1 number of clusters where the optimal k1 number of clusters is less than the optimal k number of clusters.

With the number of clusters for each of the clustering models reduced to a k1 number of clusters, the number of unique clustering models generated by each of the clustering algorithms is once again reduced. In one example, there is a 85% or greater reduction in the number of unique clustering models. In another example, there is a 75% or greater reduction in the number of unique clustering models. In another example, there is a 65% or greater reduction in the number of unique clustering models. In another example, there is a 50% or greater reduction in the number of unique clustering models.

The data associated with second reduction of unique clustering models generated by each of the clustering algorithms in the validation module 210 are then stored within a data depository 240 in association with an identification that allows the data within the data depository to be recalled. The clustering algorithms can then be executed on recalled data and the resultant clustering models scored by scoring module 212. In certain embodiments, the identification identifies one or more of: the data features, clustering algorithms and k1 number of clusters associated with the stored data. In certain embodiments, the data associated with the second reduction of unique clustering models is stored in a distributed file system, such as the Hadoop Distributed File System (HDFS); an edge node (a.k.a. gateway node) provides an interface between the distributed file system and the scoring module 212 and/or the analysis module 214. The ability to store and recall the data for model generation provides a unique model management functionality.

When scoring of the second reduction of unique clustering models is desired, the scoring module 212 operates to load the data stored within the data depository and execute each of the clustering algorithms associated with the data to re-generate the second reduction of unique clustering models. The second reduction of unique cluster models, hereafter "the final set of cluster models," are then scored by the scoring module 212 and analyzed by the analysis module 214 to arrive at a single clustering model generated by a single one of the clustering algorithms. Alternatively, scoring can occur immediately after the model generation without having to re-generate the clustering models.

Each of the clusters in each of the cluster models of the final set of cluster models is then assigned a unique segment number. Each observation of data used to generate the final set of cluster models is then assigned to, e.g., "scored," and associated, in the data depository, with a specific one of the unique segment numbers by the scoring module 212. The score of each observation is also associated with the identification so that the scores may also be recalled at a later date. Note that an observation is the unit of analysis on which the measurements are taken (a customer, a transaction, etc.); also called case, record, pattern or row (each row typically represents a record, each column a variable).

The analysis module 214 analyzes each cluster model of the final set of cluster models for comparison and selection of a single final model. The analysis of each final cluster model can include one or more of a silhouette coefficient analysis, cluster size distribution analysis, mutual information analysis, or other appropriate analysis to determine the optimal cluster model, e.g. the cluster model with the most business applicability based on one or more data features of interest or metrics of interest. The single final model selected is stored in the data depository in association with the identification and/or under a new identification that identifies one or more of: the data features, clustering algorithm and k1 number of clusters used in the single final model; the identification and/or new identification can additionally be associated with the data used to generate the model; the data used to generate the model can be identified by one or more of a name, time, date and storage location. In certain embodiments, the analysis module 214 operates to recall the single final cluster model and present it with new data such that the final selected model can be monitored over time for degradation (one or more of a silhouette coefficient analysis, cluster size distribution analysis, mutual information analysis, profiling matrix or other appropriate analysis can be used to assess degradation). If degradation is detected, new sets of cluster models can be created and assessed using existing feature selections or new feature selections to further evolve the optimal single cluster model.

Uniquely, throughout the process of determining a single final cluster model, all clustering model algorithms, numbers of clusters and resulting cluster models are stored in the data depository and are associated with one another through the common identification, e.g. a job identifier explained further below.

Figure 4:
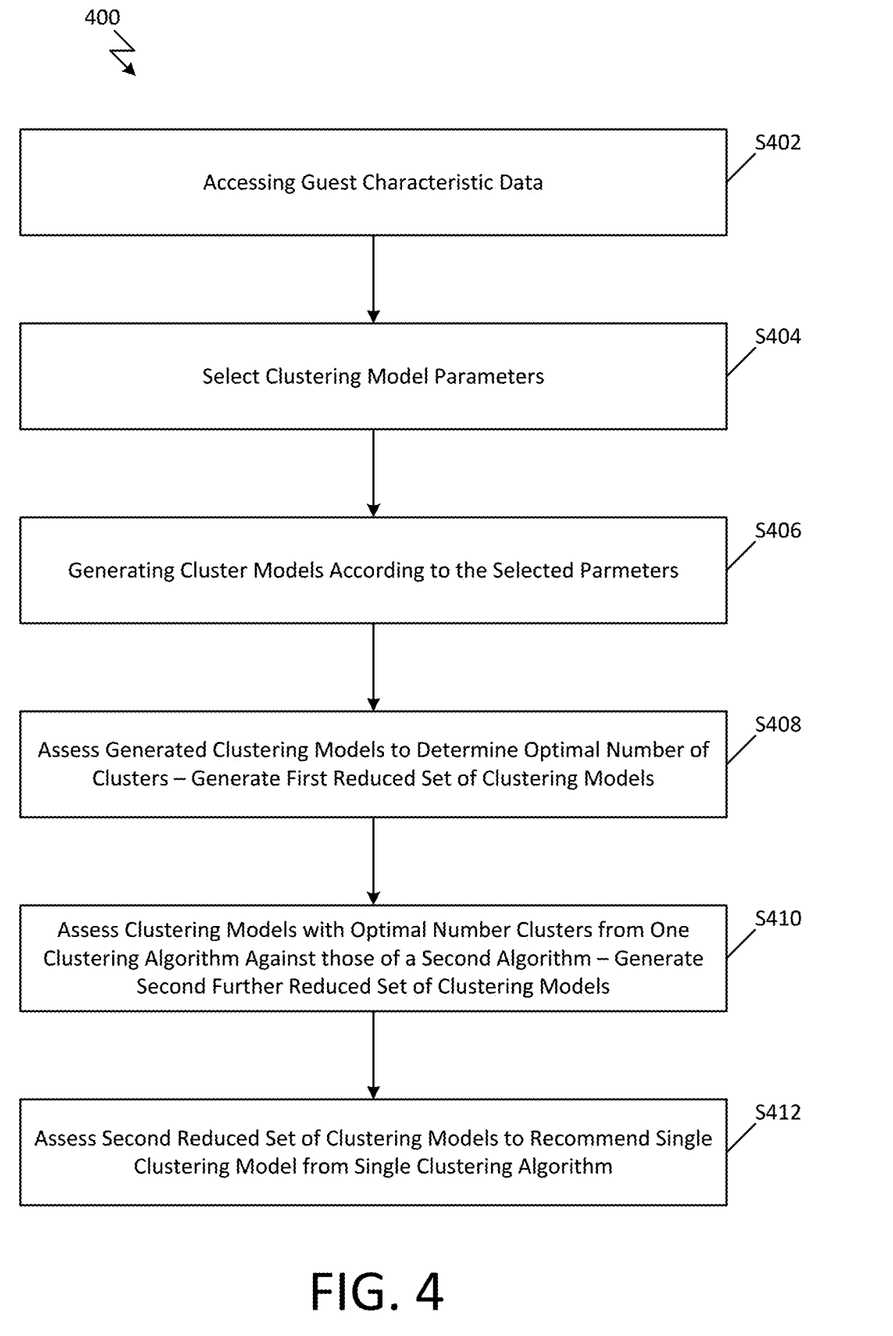
FIG. 4 is a flowchart illustrating an example method of behavioral segmentation model assessment.

FIG. 4 is a flowchart illustrating an example method 400 for behavioral segmentation clustering model assessment. The method 400 can be performed, for example, using the behavioral segmentation model assessment application 200 described above in conjunction with FIG. 2. As shown, the method 400 includes accessing guest characteristic data, which has been identified with data attributes, S402.

The method 400 further continues with selecting clustering model parameters, S404, which can include: data features, such as specific data attributes and specific data metrics (which are calculated using the guest characteristic data), at least two clustering algorithms, data regularizers and a range of initial cluster numbers.

Each of the at least two clustering algorithms are then executed in accordance with the selected parameters to generate a plurality unique clustering models, S406.

The generated clustering models are then assessed to determine an optimal number of clusters, S408. Generating clustering models with only the optimal number of cluster serves to significantly reduced the number of clustering models under consideration.

The clustering models with the optimal number of cluster from one of the at least two clustering algorithms are then assessed against the clustering models from the second of the at least two clustering algorithms using assessments such as silhouette coefficient analysis, cluster size distribution analysis and mutual information analysis, S410. The assessment serves to once again reduce the number clustering models under consideration.

The second set of reduced clustering models are then "scored," as described herein, and assessed using one or more of a silhouette coefficient analysis, cluster size distribution analysis, mutual information analysis, or other appropriate analysis to determine and recommend the optimal cluster model, e.g. the cluster model with the most business applicability based on one or more data features of interest or metrics of interest. The recommended single final clustering model, from a single clustering algorithm, can then be implemented for actual use on active data (e.g., continuously updated guest characteristic data from observed spending transactions) allowing the single final clustering model to be assessed over time for degradation, S412.

The method described above includes steps occurring in a specific sequence. However, it should be noted that the steps of the method can be performed in any suitable sequence and can include a greater or lesser number of steps than those provided in FIG. 4. Further, the recited steps can additionally, or alternatively, be combined or divided to reduce or increase the number of steps, respectively.

Figure 5:
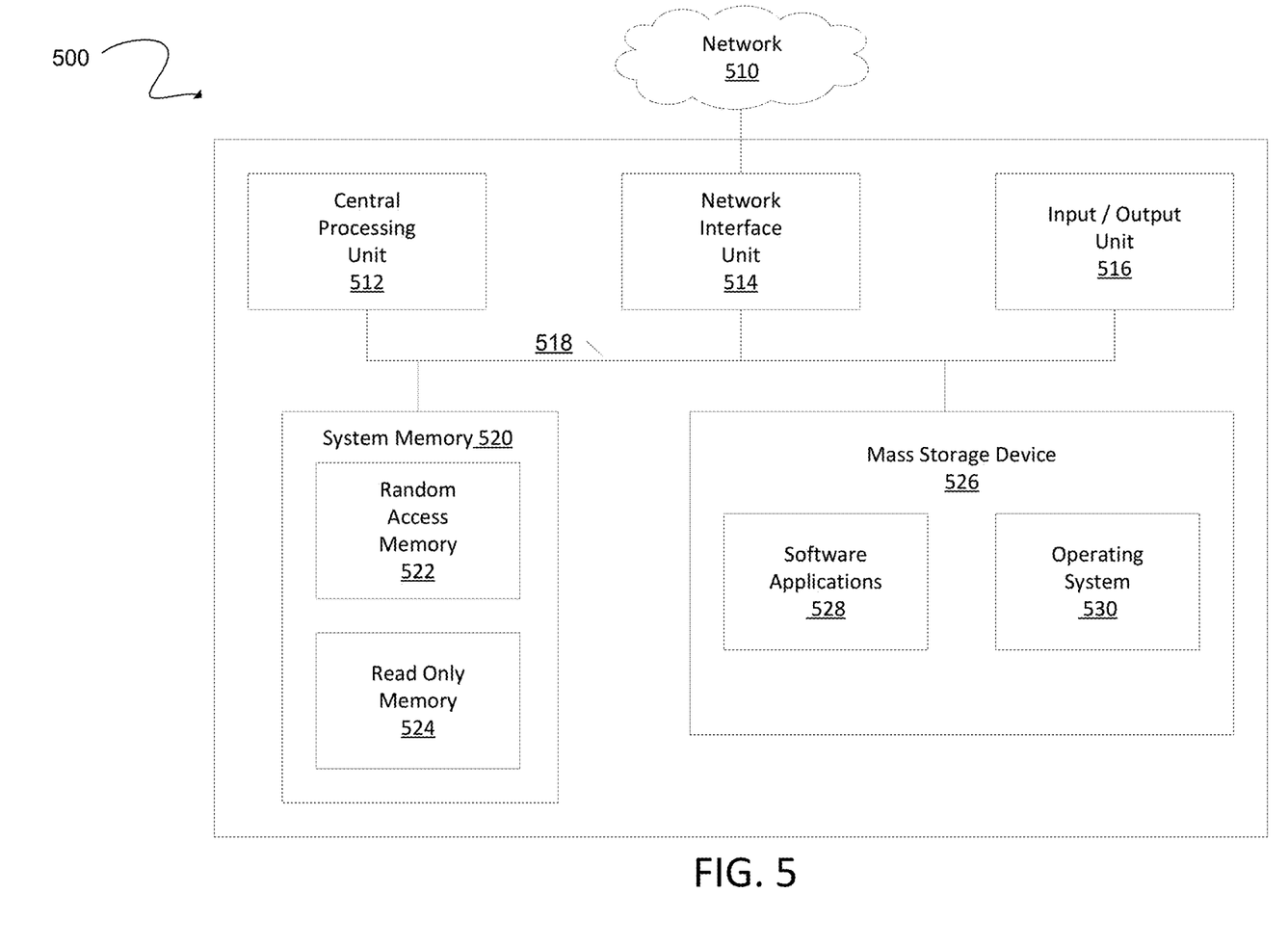
FIG. 5 is block diagram of an example computing device.

Referring now to FIG. 5, an example block diagram of a computing device 500 is shown that is useable to implement aspects of the environment 100 of FIG. 1. In the embodiment shown, the computing device 500 includes at least one central processing unit ("CPU") 512, a system memory 520, and a system bus 518 that couples the system memory 520 to the CPU 512. The system memory 520 includes a random access memory ("RAM") 522 and a read-only memory ("ROM") 524. A basic input/output system that contains the basic routines that help to transfer information between elements within the computing device 500, such as during startup, is stored in the ROM 524. The computing device 500 further includes a mass storage device 526. The mass storage device 526 is able to store software instructions and data.

The mass storage device 526 is connected to the CPU 512 through a mass storage controller (not shown) connected to the system bus 518. The mass storage device 526 and its associated computer-readable storage media provide non-volatile, non-transitory data storage for the computing device 500. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 512 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 500.

According to various embodiments of the invention, the computing device 500 may operate in a networked environment using logical connections to remote network devices through a network 510, such as a wireless network, the Internet, or another type of network. The computing device 500 may connect to the network 108 through a network interface unit 514 connected to the system bus 518. It should be appreciated that the network interface unit 514 may also be utilized to connect to other types of networks and remote computing systems. The computing device 500 also includes an input/output unit 516 for receiving and processing input from a number of other devices, including a touch user interface display screen, or another type of input device. Similarly, the input/output unit 516 may provide output to a touch user interface display screen or other type of output device.

As mentioned briefly above, the mass storage device 526 and the RAM 522 of the computing device 500 can store software instructions and data. The software instructions include an operating system 530 suitable for controlling the operation of the computing device 500. The mass storage device 526 and/or the RAM 522 also store software instructions, that when executed by the CPU 512, cause the computing device 500 to provide the functionality discussed in this document. For example, the mass storage device 526 and/or the RAM 522 can store software instructions that, when executed by the CPU 512, cause the computing device 500 to receive and analyze data as well as perform behavioral segmentation clustering model assessment.

The clustering model analysis for big data environments, as described herein, is persisted within a file system through a unique process enabling tracking and reuse of one or more elements of the clustering model analysis. Each element, or combination of elements, associated with the clustering model analysis is provided with its own unique identifier. The unique identifier is associated with meta-data that describes the contents of the element as well as where the element is physically persisted within a file system, such as an Apache Hadoop file system (HDFS) or other file system suited to storing and processing large amounts of data. The unique identifiers and associated meta-data, as well as scoring and analysis results are stored in various management tables of the HDFS. The management tables include at least a configuration management table, a data regularizer table and a fitted model table.

Figure 6:
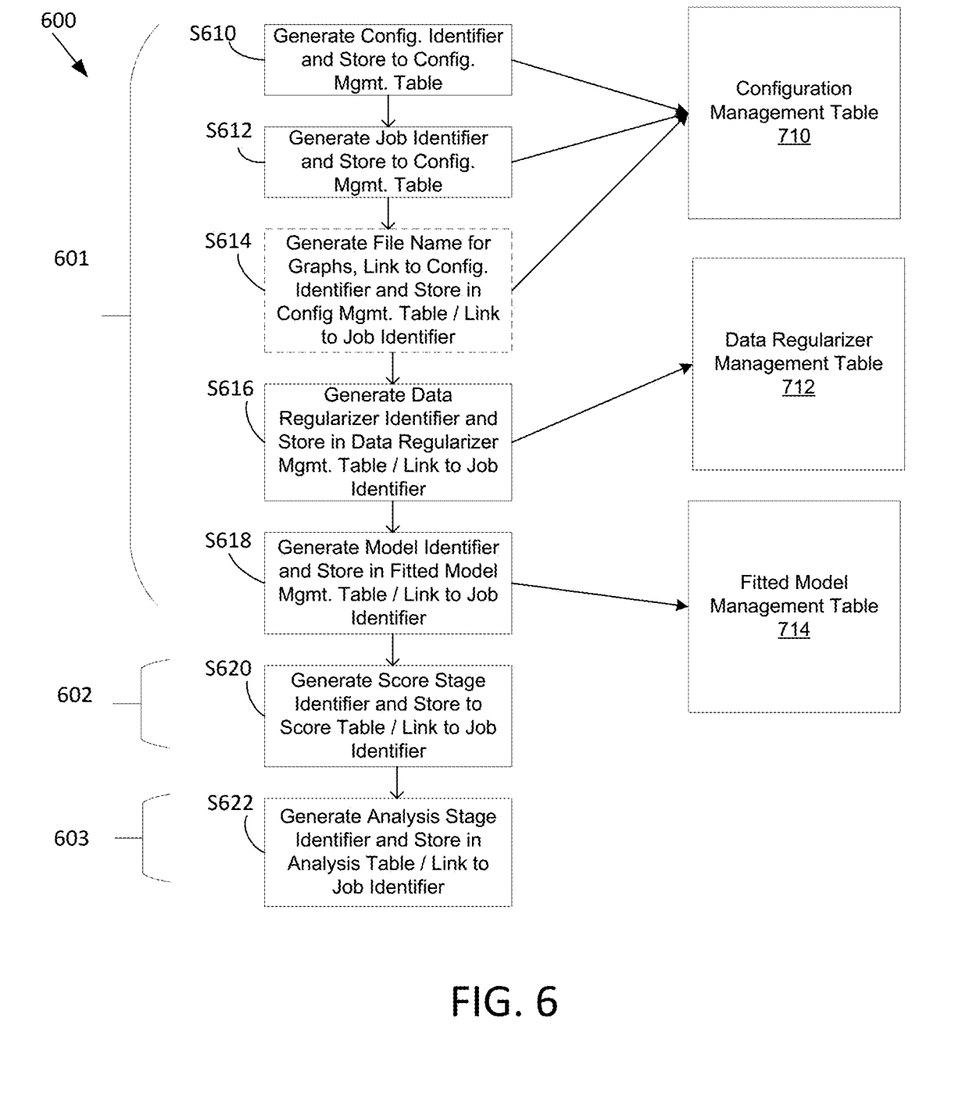
FIG. 6 is a flow chart illustrating an example of a using a large date electronic filing for persisting elements of clustering analysis.

A method 600 for persisting a clustering model analysis is illustrated in FIG. 6. The method 600 may be used, for example, to maintain a particular clustering model analysis for reuse after such an analysis is selected from among available clustering options, as noted above. As shown, the method 600 includes a pick and train stage 601 that includes generating a unique configuration identifier and storing the unique configuration identifier to the configuration management table, S610. The unique configuration identifier is associated with an analysis configuration that includes the various elements that have been selected to be used for a clustering model analysis. The elements of the analysis configuration are those elements associated with the data intake interface 202, the feature selector 204, the model generator 206, the clustering module 208 and the validation module 210. More specifically, the elements of the analysis configuration include the data set to be used, the clustering models (e.g., clustering algorithms) to be used, the selected features to be used, the data regularizers to be used and the k-value ranges to be used. The elements of the analysis configuration are stored to the configuration management table 710 in association with the unique configuration identifier along with any meta-data identifying the elements and the location of the elements within the file system. Providing the analysis configuration with a unique configuration identifier enables the analysis configuration to be re-used for different clustering model analyses.

The method 600, within the pick and train stage 601, further includes generating a unique job identifier that will persist across all remaining stages and storing the job identifier in the configuration management table 710, S612.

The method 600, within the pick and train stage 601, optionally further includes generating a file name, which includes the configuration identifier, to identify and link to visual (e.g., .pdf) graph representations of the k-optimization methods for visual confirmation/validation needs. The file name is stored in associated with the configuration identifier within the configuration management table 710, S614. The graph representations are physically persisted to an HDFS, e.g., accessible via an edge node.

The method 600, within the pick and train stage 601, further includes generating a unique data regularizer identifier (which is linked to the configuration identifier) for each of the fitted data regularizers in the analysis configuration. The unique data regularizer identifier and any meta-data describing the data regularizer is stored in the data regularizer management table 712, S616. The data regularizers are physically persisted to an HDFS, accessible via edge node.

The method 600, within the pick and train stage 601, further includes generating a model identifier, which is linked to both the configuration identifier and the data regularizer identifiers, for each fitted model of the analysis configuration and storing the model identifier and associated meta-data in the fitted model table 714, S618. Each fitted model is persisted to an HDFS, accessible via an edge node. It should be noted that data regularizers can be used across multiple fitted models, however, each fitted model has only one valid data regularizer In conjunction with the present disclosure, it is noted that the configuration management table 710, the data regularizer management table 712, and the fitted model table 714 may be maintained in local memory, or a database managed by the behavioral segmentation model assessment application 200, described above. However, the associated data, such as the graph representations, data regularizers, and fitted models stored in a data depository may be managed via a large-scale data storage systems, such as within an HDFS accessible via an edge node.

The method 600 continues with the score stage 602 corresponding to scoring module 212. As shown, a score stage configuration identifier is created and stored to the configuration management table 710, S620. The score stage configuration identifier is associated with a score stage configuration that includes the selected models and selected data set that will be used for generating scores. In generating the scores, the relevant data (which can be obtained through query logic or previously identified), the selected models and their respective data regularizers, are loaded by specifying a specific model identifier or a job identifier to the scoring module 212 (e.g., the cluster analysis application). The links established with the specific model identifier or job identifier load all the relevant objects from their physical locations and applies them to the data. The resulting scores produced by the scoring module 212 are persisted in a scores table and the associated specific model identifier or job identifier are persisted with the resulting scores.

The method 600 continues with the analysis stage 603 corresponding to analysis module 214. As shown, an analysis stage configuration identifier is generated and stored to the configuration management table 710, S622. The analysis stage configuration identifier is associated with an analysis stage configuration that indicates what types of analyses are to be performed on the scores. In performing and generating the analysis, the relevant data (which can be obtained through query logic or previously identified), the selected models and their respective data regularizers, are loaded by specifying a specific model identifier or a job identifier to the analysis module 214 (e.g., an analysis metrics application). The links established with the specific model identifier or job identifier load all the relevant objects from their physical locations and applies them to the data. The results of the analysis produced by the analysis module, e.g., the analysis metrics, are persisted in an analysis table along with the associated analysis type and the specific model identifier or job identifier.

In summary, the method 600 generally provides each element of the analysis with a unique identifier while management tables store meta-data information in association with the identifier including where each element is physically persisted in Hadoop (e.g., accessible via edge node of the Hadoop file system (HDFS)). The management tables generally include a configuration management table 710, a data regularizer management table 712, and a fitted model management table 714. The configuration management table 710 stores a unique analysis configuration identifier for each analysis configuration and a unique job identifier for each job (e.g., each clustering analysis) that is performed in associated with their respective meta-data (e.g., parameters and physical location). The data regularization management table 712 stores a data regularizer identifier for each data regularizer in association with meta-data that indicates the type of data regularizer, the parameters of the regularizer and its physical location. The fitted model management table 714 stores a unique model identifier for each fitted model in association with meta-data that indicates the type of model, the parameters of the model and the physical location of the model. The output of applying a fitted model to input data, e.g., performance of a cluster analysis, results in scores. The scores for a specific model are persisted in a Hive table on Hadoop along with the model identifier so that links to all elements associated with the cluster analysis are maintained. Analysis of the scores, with measurements such as the silhouette coefficient, are also persisted in a Hive table along with the model identifier so that links to all elements associated with the cluster analysis are maintained. Note that the job identifier is the common link to the specific cluster analysis as the job identifier is linked to the analysis configuration identifier, to each data regularizer identifier and to each model identifier that is used in the specific cluster analysis. The job identifier is additionally linked to the score configuration identifier and the analysis identifier.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process/method are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects are described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed:

1. A method of persisting and performing a clustering analysis, the method comprising:
    defining an analysis configuration that includes meta-data identifying: a selected data set and a location of the selected data set, a plurality of clustering algorithms and a location of the plurality of clustering algorithms, a plurality of data regularizers and a location of the plurality of data regularizers, and an initial range of clusters;
    generating a plurality of clustering models using the plurality of clustering algorithms and the selected data set, with each possible combination representing a unique clustering model;
    generating a reduced set of clustering models selected from the plurality of clustering models and the initial range of clusters;
    generating a unique configuration identifier, associating the unique configuration identifier with the analysis configuration, and storing the unique configuration identifier in a configuration management table along with the meta-data of the analysis configuration;
    generating and storing a job identifier that identifies a clustering analysis to be performed, wherein the job identifier is linked to the unique configuration identifier;
    generating a unique data regularizer identifier for each of the plurality of data regularizers of the analysis configuration and storing each unique data regularizer identifier in a data regularizer management table along with meta-data for each of the data regularizer identifiers, wherein each of the unique data regularizer identifiers is linked to the job identifier;
    generating a unique model identifier for each of the reduced set of clustering models of the analysis configuration and storing each unique model identifier in a model management table along with meta-data for each of the model identifiers, wherein each of the unique model identifiers is linked to the job identifier;
    specifying the job identifier to a clustering analysis application causing the analysis configuration, the plurality of clustering models and the plurality of data regularizers to load into the clustering analysis application; and
    receiving a plurality of scores resulting from a cluster analysis performed by the clustering analysis application based on the job identifier.

2. The method of claim 1, wherein meta-data for each data regularizer identifier includes a location, type and parameter of the data regularizer.

3. The method of claim 1, wherein meta-data for each model identifier includes a location, type and parameter of the clustering model.

4. The method of claim 1, wherein each unique model identifier is additionally linked to a single one of the unique data regularizer identifiers.

5. The method of claim 1, wherein at least one of the plurality of unique data regularizer identifiers is linked to a plurality of unique model identifiers.

6. The method of claim 1, further comprising associating the cluster analysis with a unique score configuration identifier corresponding to each of the clusters and linking the unique score configuration identifier to the job identifier.

7. The method of claim 6, further comprising assigning a score stage configuration identifier to the plurality of scores and persisting the score stage configuration identifier along with the associated scores in a score table.

8. The method of claim 7, further comprising linking the score stage configuration identifier with the job identifier.

9. The method of claim 1, further comprising:
    specifying the job identifier to an analysis metrics application causing the analysis configuration, plurality of clustering models and plurality of data regularizers to load into the analysis metrics application; and
    receiving analysis metrics resulting from a metrics analysis performed by the analysis metrics application based on the job identifier.

10. The method of claim 9, further comprising assigning an analysis stage configuration identifier to the analysis metrics and persisting the analysis stage configuration identifier along with the analysis metrics in an analysis table.

11. The method of claim 10, further comprising further comprising linking the analysis stage configuration identifier with the job identifier.

12. A method of persisting and performing a clustering analysis comprising:
    within a large data electronic file system, generating a job identifier and linking the job identifier with a configuration identifier, a plurality of model identifiers and a plurality of data regularization identifiers, wherein each of the configuration identifier, model identifiers and data regularization identifiers are stored in respective management tables of the file system along with meta-data indicating a physical location of an analysis configuration, a physical location of a data regularizer and a physical location of a clustering model, respectively, for each of an initial range of clusters;
    specifying the job identifier to a clustering analysis application causing the analysis configuration, the clustering models and the data regularizers to load into the clustering analysis application;
    receiving a plurality of scores resulting from a cluster analysis performed by the clustering analysis application based on the job identifier;
    generating a reduced set of clustering models from the clustering models based on the plurality of scores; and
    tracking degradation of a clustering model over time to reduce the number clusters used in a clustering model.

13. The method of claim 12, wherein the meta-data of the configuration identifier indicates a data set to be used.

14. The method of claim 12, wherein the meta-data for the data regularizer identifier includes a type and parameter of the data regularizer.

15. The method of claim 12, wherein the meta-data for the model identifier includes a type and parameter of the clustering model.

16. The method of claim 12, wherein each of the plurality of model identifier is additionally linked to a single one of the data regularizer identifiers.

17. The method of claim 12, wherein at least one of the plurality of data regularizer identifiers is linked to a plurality of unique model identifiers.

18. The method of claim 12, further comprising associating the cluster analysis with a unique score configuration identifier corresponding to each of the clusters and linking the unique score configuration identifier to the job identifier.

19. The method of claim 18, further comprising assigning a score stage configuration identifier to the plurality of scores and persisting the score stage configuration identifier along with the associated scores in a score table.

20. A method of utilizing a large data electronic file system comprising:

defining a cluster analysis configuration that includes meta-data identifying: a selected data set and a location of the selected data set, a plurality of clustering models and a location of a plurality of clustering algorithms, a plurality of data regularizers and a location of the plurality of data regularizers, and an initial range of clusters, wherein the plurality of clustering models are generated using the plurality of clustering algorithms and the selected data set, with each possible combination representing a unique clustering model;

generating a reduced set of clustering models selected from the plurality of clustering models and the initial range of clusters;

generating a unique configuration identifier for each of the reduced set of clustering models, associating the unique configuration identifier with the cluster analysis configuration, and storing the unique configuration identifier in a configuration management table along with the meta-data of the cluster analysis configuration;

generating and storing a job identifier that identifies a clustering analysis to be performed, wherein the job identifier is linked to the unique configuration identifier;

generating a unique data regularizer identifier for each of the plurality of data regularizers of the cluster analysis configuration and storing each unique data regularizer identifier in a data regularizer management table along with meta-data for each of the data regularizer identifiers, wherein each of the unique data regularizer identifiers is linked to the job identifier; and generating a unique model identifier for each of the plurality of clustering models of the cluster analysis configuration and storing each unique model identifier in a model management table along with meta-data for each of the model identifiers, wherein each of the unique model identifiers is linked to the job identifier.

* * * * *